(12) United States Patent
Morlat et al.

(10) Patent No.: US 9,773,082 B1
(45) Date of Patent: Sep. 26, 2017

(54) CIRCUIT DESIGN EMPLOYING STAMP PATTERNS

(71) Applicant: Cadence Design Systems, Inc., San Jose, CA (US)

(72) Inventors: Fabrice Raymond Morlat, Montbard (FR); Gerard Tarroux, Villeneuve-Loubet (FR); Fabien Campana, Les Adrets de l'Esterel (FR)

(73) Assignee: CADENCE DESIGNS SYSTEMS, INC., San Jose, CA (US)

( * ) Notice: Subject to any disclaimer, the term of this patent is extended or adjusted under 35 U.S.C. 154(b) by 235 days.

(21) Appl. No.: 14/688,867

(22) Filed: Apr. 16, 2015

(51) Int. Cl.
*G06F 17/50* (2006.01)
(52) U.S. Cl.
CPC ................ *G06F 17/505* (2013.01)
(58) Field of Classification Search
USPC ........................................ 716/104
See application file for complete search history.

(56) References Cited

U.S. PATENT DOCUMENTS

2014/0298278 A1* 10/2014 Badar ................. G06F 17/5068
716/104
2015/0254389 A1* 9/2015 Lee ..................... G06F 17/5081
716/112

\* cited by examiner

*Primary Examiner* — Bryce Aisaka
(74) *Attorney, Agent, or Firm* — Andrews Kurth Kenyon LLP

(57) ABSTRACT

Methods and systems provide aspects of electronics layout design including copying of layout element(s) and graphically defining a one-to-one correspondence between two elements. An exemplary method may include defining a cloning constraint for a layout, rendering a user interface (UI) to display at least one of a schematic and form representation of the layout, and receiving a selection of at least one element in the layout. The method may create a movable drag set based on the selection, and responsive to a matching of at least one element of the drag set with another element in the layout, performing a one-to-one correspondence for the matched elements. The matching may be an overlap of at least one element in the drag set with an element in the layout having the same master.

20 Claims, 5 Drawing Sheets

100

200

400

500

600

700

CIRCUIT DESIGN EMPLOYING STAMP PATTERNS

FIELD OF THE DISCLOSURE

The present disclosure relates to a method and system for processing elements in an electronics layout software tool. More specifically, it relates to processing aspects of circuit layout design including copying of layout element(s) and graphically defining a one-to-one correspondence between two elements.

BACKGROUND

Circuit design may include layout and verification phases. A useful tool for circuit design is a schematic, which is a diagram showing how a physical circuit is constructed. A symbol in a schematic may represent a component in a physical circuit. An element of the schematic ("source element") may be in one-to-one correspondence with an element in the physical circuit ("target element"). Defining such a one-to-one correspondence may include forming a connection or association. For example, a correspondence may be an association between a schematic element and a layout element. As another example, a one-to-one correspondence may be a basis for forming an electrical connection between a source element and a target element or determining how two components are bonded to each other in later design phases. A one-to-one correspondence may be used with one or more graph algorithms to determine how schematic components are bound to layout components. Typical methods and systems for forming a one-to-one correspondence are solely text-based and may be difficult or tedious to use.

DETAILED DESCRIPTION

Figure 1:
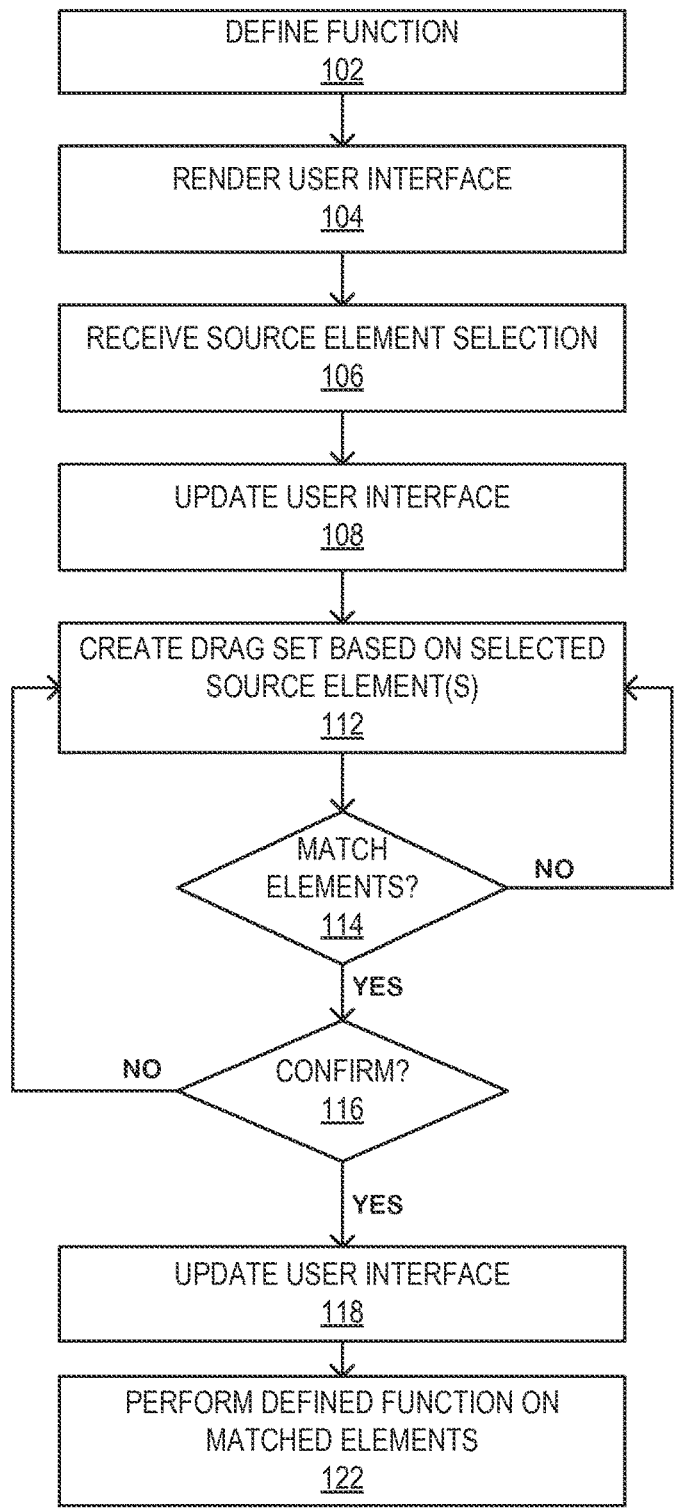
FIG. 1 is a flowchart of a method of processing electronics layout software tool elements according to an embodiment.

The present disclosure provides a graphical method of layout cloning, including formation of a one-to-one correspondence between components (also referred to as "devices" and "elements"), in which such one-to-one correspondence are most applicable when the components of a schematic may be repetitive. For example, a previously identified one-to-one correspondence may be applicable to forming another one-to-one correspondence. In one aspect, a previously identified one-to-one correspondence may be applicable to forming another one-to-one correspondence, if components are connected in the same way in both situations. In such situations, layout components may be cloned to quickly create one-to-one correspondences.

Methods and systems of the present disclosure may help a user to efficiently define and/or find a one-to-one correspondence. In an embodiment, a method includes defining and using a stamp pattern, e.g., a re-usable cookie cutter or stencil, to quickly process electronics layout software tool elements, either automatically or systematically based on the set up. A stamp pattern finds application in a variety of contexts. For example, a stamp pattern may be used to define a one-to-one correspondence between elements. A stamp pattern may represent one or more source elements. A source element may be repeated based on the stamp pattern, e.g., cloned or replicated with a modification in a layout. For instance, the stamp pattern may generate a copy of a source element, alter the copy of the source element or clone the copy of the source element, and be used to match a target element. The stamp pattern may include parameters and/or constraints for replication using the stamp pattern. For instance, the stamp pattern may include alteration of the stamp pattern such rotation, mirroring, etc. The stamp pattern may edit and/or delete object(s) from a set, replicate an action on an element of a repeated table, etc.

In an embodiment, the stamp pattern may be a drag set. A drag set may be a set of elements capable of being replicated and/or altered. The drag set may be moved within an area to find matches and to create a one-to-one correspondence between elements. For example, a user may select elements from a layout to form a drag set, which may include copies of the selected elements. The drag set may be moved within a user interface ("UI") to form a match between element(s) of the drag set and an element in the layout. In response to a matching, a one-to-one correspondence may be defined in accordance with defined cloning constraints. In one aspect, the drag set may be a stamp pattern. Elements may be added or removed from the drag set so that the stamp pattern may be altered as discussed herein. In embodiments, the graphical way of defining a one-to-one correspondence between two sets of objects may be completed with a minimal number of clicks or user commands. In typical methods, defining a one-to-one correspondence includes at least N commands, where N is the number of elements in a set of objects. In embodiments, the number of commands may be less than N for a set of N elements. For example, a single command may be sufficient to define a one-to-one correspondence of N objects. As another example, two commands may be sufficient to define a one-to-one correspondence of N objects.

FIG. 1 is a flowchart of a method 100 for a computer system to process elements in the electronics layout software tool involving source and target elements. The method 100 may define such a function in the electronics layout software tool (102) selected by the user. The function may be associated with a stamp pattern. For instance, the function may be a creation of a one-to-one correspondence between elements. A symmetry constraint may be a parameter associated with a device. For example, a symmetry constraint may be set for two schematic devices, which may indicate that a layout representation of the two schematic devices is to be symmetric with each other. The symmetry constraint may provide information regarding a symmetry direction (such as X or Y) and the devices involved. In an operation, based on an initial placement of layout elements representing these devices, responsive to movement of a layout element, another element may be moved to maintain a defined symmetry. A symmetry constraint may be applied to more than two schematic devices.

In an embodiment, a clone constraint may be set on two sets of schematic devices with a one-to-one correspondence between devices from the two sets. The clone constraint may be used to create a layout clone. For instance, once N devices from a first set ("clone source") are placed in the layout, N devices from the other set ("clone target") may be cloned. In an embodiment, cloning includes generating a clone target (i.e., the N other devices) in the layout with corresponding binding and a same relative position as the clone source devices. For example, a binding may be a correspondence between a schematic element and a layout element. In an embodiment, a clone constraint may override other constraints.

The stamp pattern action may be creating a constraint on cloning of elements. The method may render a user interface (104). For example, the user interface may be adapted to the function defined in 102 and may be suitable for illustrating aspects of the function or effects of the function.

Figure 3:
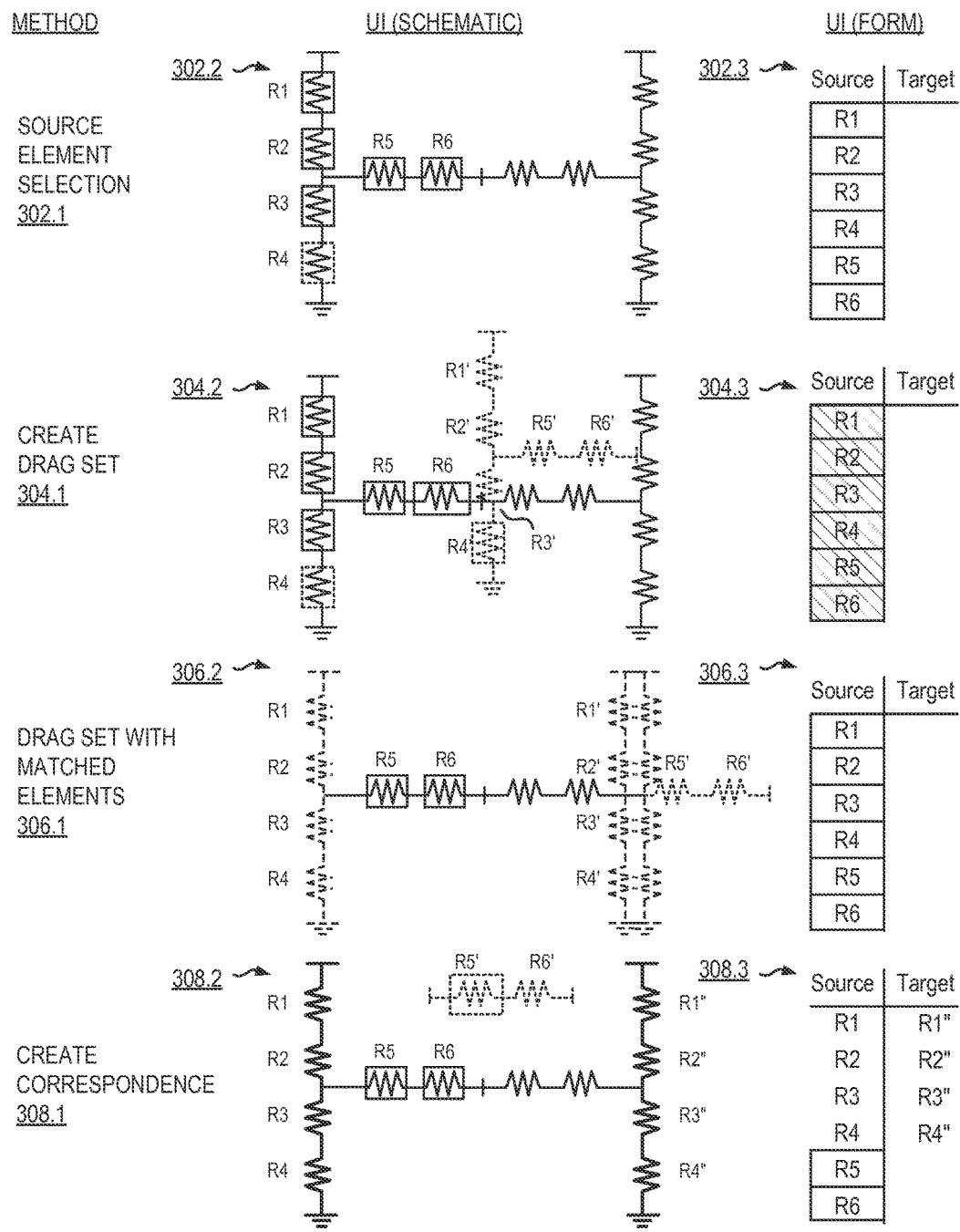
FIG. 3 illustrates exemplary user interfaces corresponding to various aspects of element processing according to an embodiment.

FIG. 3 illustrates exemplary user interfaces ("UI") 302-308 that may correspond to method 100 or a similar method. In one embodiment, at least a portion of the user interface may include a schematic (represented as "UI (SCHEMATIC)" in FIG. 3). The schematic may include symbols representing elements in a physical circuit. For example, in UI 302.2, the schematic includes symbols representing a network of resistors.

In another embodiment, at least a portion of the user interface may be text based, e.g., a form or table (represented as "UI (FORM)" in FIG. 3). In an embodiment, the form may be a "capture correspondence" form. The form may represent components in a physical circuit using a listing of the components. A source column may be populated with source devices. For example, in UI 302.3, the form includes R1-R6, which represents each resistor of a network of resistors. UI 302.3 may represent a state of the circuit prior to one-to-one correspondence because the target elements have not been identified for source elements (shown as blank in the form). Upon definition of a one-to-one correspondence, the target column may be populated with a target element associated with a source element.

Each of the schematic UI and the form UI represents an alternative way of controlling the layout process. A user may use the UI with which the user is most comfortable. A particular type of UI may also be more suitable for some applications. For example, the form UI allows a user to quickly visualize which elements already have a one-to-one correspondence. A user may quickly define matches for a subset of source elements by modifying the form UI. For example, the user may know a target element for a source element and may select/de-select those source elements using the form. On the other hand, a user may prefer to use the schematic UI to visualize a layout of a circuit.

The schematic UI and the form UI may be displayed in various ways. By way of non-limiting example, the schematic UI and the form UI may be displayed simultaneously or sequentially. In an embodiment, each UI may display a link to another UI. Upon activation of the link, e.g., by mouse click or tap of a touch screen, a UI may be displayed. The UI may replace an existing UI or the UI may be displayed as a pop-up window.

Returning to FIG. 1, at 106, the method 100 may receive a selection for one or more source elements. The selected source element(s) may form a basis for creating a one-to-one correspondence. The selection may be made by a user via a UI. In an embodiment, the selection may be made via a graphical user interface (GUI). For example, the schematic UI may be a GUI. In an alternative embodiment, the selection may be made via a combination of a GUI and a text-based UI. For example, the form UI may be text-based. The selection may be made in various ways and may be based on how source elements are presented for selection. Selection may be made by mouse click, tapping a touch screen, etc. Upon selection of the source element(s), the UI may be updated to reflect the selection (108).

Elements that have been selected may also be de-selected, e.g., by clicking or tapping the element. Other keyboard and/or mouse commands for de-selection are possible and may be pre-defined or defined by a user. For example, a user may de-select elements from the schematic UI by holding the Ctrl key or Shift key while clicking elements shown in the schematic UI. Multiple elements may be selected and/or de-selected by area selection, e.g., dragging a box around the desired elements. By way of non-limiting example, error correction may be implemented by causing some clicks to have no effect or an effect different from selection or de-selection. For example, the following actions may be subject to error correction: Shift click or Ctrl click on an element which is not a source element, Ctrl click on a device which is a source element but already unselected, Shift click on an element which is a source element but already selected. One of ordinary skill in the art would understand that other shortcuts, including keyboard shortcuts, are possible and may be pre-defined or defined by a user.

Figure 4:
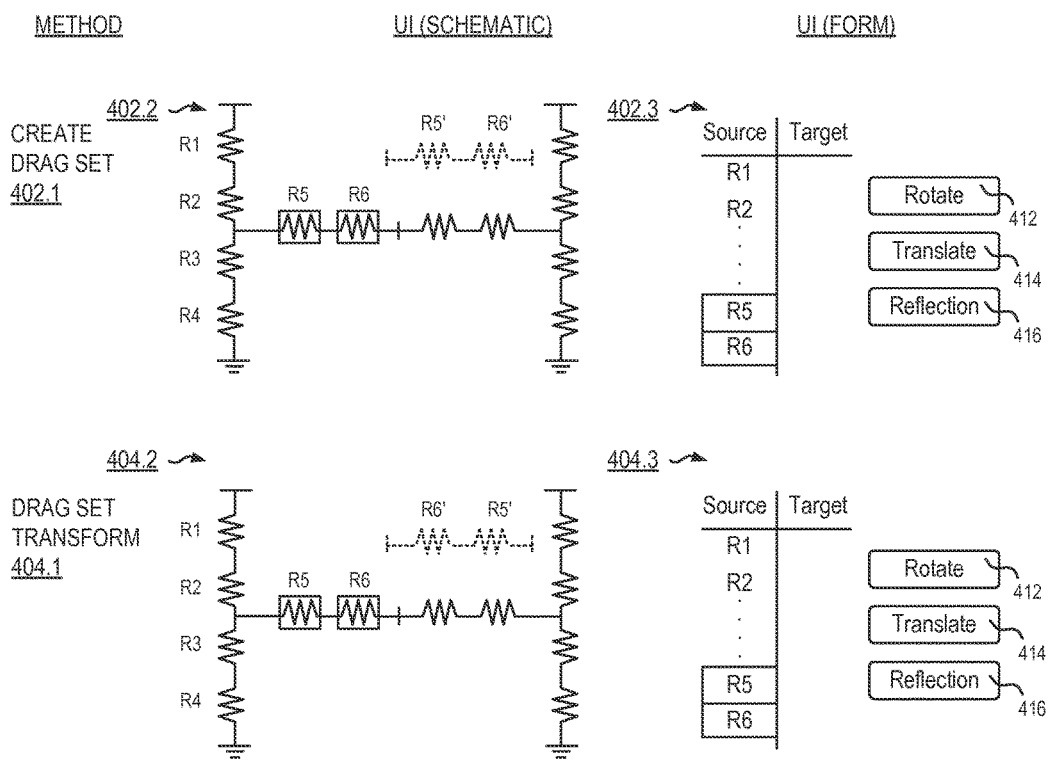
FIG. 4 illustrates exemplary user interfaces corresponding to various aspects of element processing according to an embodiment.

In an embodiment, the selection may be made on a schematic UI. For example, in a schematic UI 302.2 in FIG. 3, selection is indicated in the schematic UI by displaying a box around the selected elements, R1-R6 (shown) or by highlighting the selected elements (not shown). In an alternative embodiment, the selection may be made on the user interface for a form, e.g., by selecting a source element in the form. For example, in a form UI 302.3, selection may be indicated in the form UI by displaying a box around the selected elements, R1-R6. As another example, selection may be indicated in a form UI 304.3 by highlighting the selected elements, R1-R6. It is possible to select any number of elements. For instance, schematic UI 302.1 shows selection of six elements, R1-R6. Schematic UI 402.2 in FIG. 4 shows selection of two elements, R5 and R6 as dashed line elements R5' and R6'.

In an embodiment, the UI may further indicate a reference element. A reference element may be a visual aid in a schematic. In an embodiment, the reference element is the bottom-left-most element. For example, a selected group of elements may be re-configured, e.g., translated, reflected, or otherwise transformed, etc. as discussed herein. The reference element would enable a user to quickly determine and track a group of elements. In the example of schematic UI 302.2, resistor R4 is a reference element (represented with a dashed box). One of ordinary skill in the art would understand that an element may be indicated to be a reference element in any of a variety of ways. For example, the reference element may be highlighted in a color different from the other selected elements, animated, etc.

As discussed, elements may be selected from any type of UI. Elements may be selected from any combination of UIs. For example, a user may select and/or de-select one or more elements via a schematic UI. A user may then select and/or de-select one or more additional elements via a form UI. Alternatively, a user may begin selection from form UI then switch over to schematic UI for element selection. Each UI may be updated to reflect a current selection of elements.

Returning to FIG. 1, based on the selection in 106, the method 100 may create a drag set including the selected elements (112). The drag set may include copies of the selected elements. A drag set may include a set of elements that may be moved and/or on which further functions may be performed. For instance, a drag set may be moved to a different portion of a schematic. FIG. 3 shows a drag set 304 including resistors R1'-R6'. Resistors R1'-R6' may correspond to selected elements R1-R6. In an embodiment, the drag set may be dragged or moved within the UI. Schematic UI 304.2, for example, shows a drag set being moved to a different position on the screen (in dashed lines), although the movement of the drag set can be shown in the UI in any other suitable manner such as showing the drag set as being highlighted.

In an embodiment, as seen in FIG. 1, a "match" command causes further functions to be performed on the drag set, e.g., connecting for a possible one-to-one correspondence may not be made until a match command is received (114). The user may indicate a match by clicking a mouse button or providing another input such as a release on a touch screen. The method 100 may determine whether elements have been matched. In an embodiment, to create a matching, a user moves a drag set such that the drag set at least partially overlaps with an existing component on the schematic UI.

If a device from the drag set overlaps with an existing element with a same master as the source element, the drag set element may be considered a "matched element." A master may be a master device, such a type of circuit element. For example, a master device for each of the resistors shown in FIG. 3 is a resistor. In other instances, a master device may be a transistor such as a PMOS or NMOS transistor (not shown). In an embodiment, two resistors may share a same master, while a resistor and a transistor may not share a same master. That is, three elements may correspond to a matching: the drag set element, an underlying element in the layout causing the drag set element to become matched, and a selected source element, e.g., the element from which the drag set is formed. At least one of these three types of elements may be indicated in the schematic UI and/or form UI. In an embodiment, the underlying element is called a "matched target," the selected source element may be called a "matched source," and the drag set element may be called a "matched element." In an embodiment, a reference element, which is part of a drag set may be matched and may be indicated as a matched element.

Schematic UI 306.2 of FIG. 3 shows an example configuration including matched elements. The schematic UI 306.2 reflects a state in which elements R1'-R4' have been matched. The matching may be indicated by a matched element, matched source, and/or matched target becoming dashed, where the dash pattern is different from the drag set dash pattern shown in 304.2. The matching may be indicated in other manners, e.g. by highlighting matched devices in the same color (not shown). At least one of the matched source, matched target, and matched element may be indicated in the same manner, such as being highlighted in the same color. For example, in FIG. 3, schematic UI 304.2 reflects a state in which elements have not been matched. As the drag set is dragged to at least partially overlap with an existing device in the schematic, a match occurs between R1'-R4' and the existing resistors (not labeled). The match is indicated by showing matched elements R1'-R4' in a dashed pattern different from that of unmatched devices R5' and R6'.

As shown in schematic UI 306.2, a matching may include some or all of the elements of a drag set. In the example of schematic UI 306.2, a sub-set of a drag set is matched. That is, elements R1'-R4' are matched, but elements R5' and R6' are not matched. Whether an element matches may be determined by user or the system. By way of non-limiting example, a match may be based on checks of parameters such as resistance of a resistor being within a range of values, e.g., compared with a source element; whether connections between elements are possible, etc.

Returning to FIG. 1, if elements are matched, the method may confirm the matching, e.g., via a prompt to the user (116). In response to the confirmation, the user interface may be updated (118). The user may indicate confirmation (also referred to as "checking in" the match). For example, the user may confirm the selection by clicking a mouse button or tapping a touch screen. After updating the user interface in 118, the method 100 may then, responsive to a matching, perform a defined function on the matched elements (122). For example, the function may be creating a one-to-one correspondence, e.g., among other things, forming connections between source and target elements.

Schematic UI 308.2 of FIG. 3 illustrates a drag set that has been matched and confirmed (308.1). In FIG. 3, R1 corresponds to R1", R2 corresponds to R2", R3 corresponds to R3", and R4 corresponds to R4". The correspondence is represented in the form UI showing a target element corresponding to a source element. The UI, e.g., the schematic UI, may be updated in one or more ways responsive to a confirmation. In an embodiment, the matched elements are removed from the drag set. The matched targets and/or corresponding source elements may be indicated. In schematic UI 308.2, the matched targets and corresponding source elements are indicated by being shown in bold. The matching may be indicated in other ways, e.g., highlighting in a color. The drag set may be re-computed with those devices that have not matched. The reference device may be re-computed. Schematic UI 308.2 shows a re-computed drag set including elements R5' and R6'. Element R5' has been designated as the reference element, which is represented by the dashed box around reference element R5'. Form UI 308.3 may be updated accordingly. For example, a one-to-one correspondence is formed between R1-R4 and R1"-R4", while the selected elements include R5 and R6.

In the example of UI 308.3, a one-to-one correspondence has been defined for elements R1-R4 but not elements R5 and R6. For example, this may be because the elements R1-R4 matched, but not elements R5 and R6. For example, the drag set may have not been sufficiently dragged to overlap with underlying elements for components R5 and R6 to create a one-to-one correspondence. The user may continue with elements R5 and R6. In an embodiment, a drag set including elements R5' and R6' may remain. The method may return to 112 (not shown) to perform further actions on elements R5' and R6'. Although the example shows a subset of elements selected, it is possible to create a correspondence on an entire set of source devices.

Figure 2:
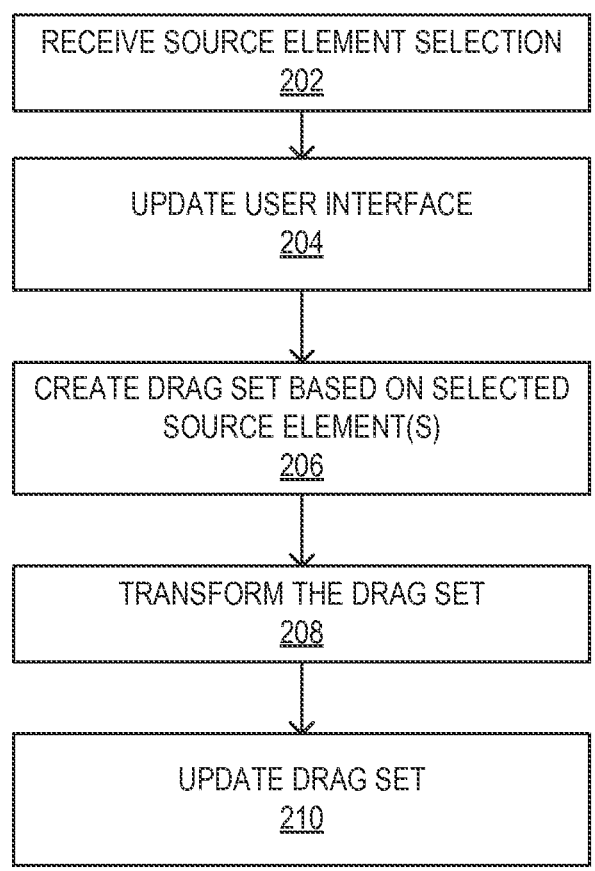
FIG. 2 is a flowchart of a method of processing electronics layout software tool elements according to an embodiment.

FIG. 2 is a flowchart of a method 200 for a computer system to perform a user-selected function in the electronics layout software tool involving source and target elements. Method 200 may be performed in combination with method 100. The method 200 may receive a selection for one or more source elements (202). The selected source element(s) may form a basis for creating a one-to-one correspondence. The selection may be made by a user via a UI. The selection may be made in various ways and may be based on how source elements are presented for selection. Selection may be made by mouse click, tapping a touch screen, etc. Upon selection of the source element(s), the UI may be updated to reflect the selection (204).

Elements that have been selected may also be de-selected, e.g. by clicking or tapping the element. Other keyboard and/or mouse commands for de-selection are possible and may be pre-defined or defined by a user. For example, a user may de-select elements from the schematic UI by holding the Ctrl key or Shift key while clicking elements shown in the schematic UI. Multiple elements may be selected and/or de-selected by area selection e.g., dragging a box around the desired elements. By way of non-limiting example, error correction is may be implemented by causing some clicks to have no effect or an effect different from selection or de-selection. For example, the following actions may be subject to error correction: Shift click or Ctrl click on an element which not a source element, Ctrl click on a device which is a source element but already unselected, Shift click on an element which is a source element but already selected.

Based on the selection in 202, the method 200 may create a drag set including the selected elements (206). The drag set may include copies of the selected elements. A drag set may include a set of elements that may be moved and/or on which further functions may be performed. For instance, a drag set may be moved to a different portion of a schematic. FIG. 4 shows a drag set 402 including resistors R5' and R6'. Resistors R5' and R6' may correspond to selected elements R5 and R6. In an embodiment, the drag set may be dragged or moved within the UI. Schematic UI 402 shows a drag set being moved to a different position on the screen (in dashed lines).

At 208, the method 200 may transform and/or translate the drag set, either directly, as a part of the method, or via a received command. FIG. 4 shows examples of ways in which a drag set may be transformed and/or translated. In an embodiment, the configuration of the drag set may be transformed, which may correspond to 208 in FIG. 2. For example, the drag set may be transformed, e.g., rotated, reflected, flipped, translated, etc. (404.1). Constraints on the transformation of the drag set may be defined in other manners. The constraint may be defined prior to element selection so that upon selection of an element, a drag set is produced that satisfies the constraint. In FIG. 4, a drag set may be reflected about a y-axis so that the updated drag set shows an output of R6' connected to an input of R5'. Possible functions may be displayed on the user interface. For example, UI may include buttons 412-416 that may be activated to cause a rotation, sideways and/or upside down translation of the drag set. These buttons are represented in the UI as "Rotate," "Translate," and "Reflection." This is shown in form UI 402.3 and form UI 404.3.

Figure 5:
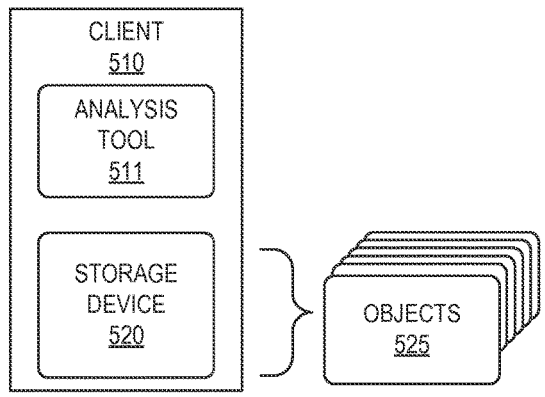
FIG. 5 is a simplified block diagram of a system according to an embodiment.

The methods and systems described herein have particular utility in electronic design and verification automation in conjunction with the feature of creating a one-to-one-correspondence to facilitate transformation of a behavioral description of hardware architecture, such as a circuit or other electronics, into a structural description of the hardware architecture. For example, the transformation may include translating untimed or partially timed functional code to a timed RTL implementation. As another example, the transformation may output an RTL description of a micro-architecture that will be implemented for a chip. While the description here pertains to creating a one-to-one correspondence, the concepts described here apply as well to other applications, such as the replication of elements using a stamp pattern. As discussed herein, a stamp pattern may represent a variety of functions and finds application in a variety of contexts. For instance, in a spreadsheet application, a stamp pattern may be used to replicate an action on an element of a repeated table. FIG. 5 is a simplified block diagram of a system implementing the methods and systems described herein. As shown in FIG. 5, a system 500 may include a client 510 executing an analysis tool 511 and having a storage apparatus 520. The client 510 may be any computing system that executes an analysis tool 511 or otherwise facilitates access to storage 520, for example a personal computer. The client 510 may include a processor that performs a method in accordance with the disclosed embodiments. Such a client may be a tool environment or may be part of an overall test system in accordance with the disclosed embodiments.

Hardware models, instruction sets, software packages, timing files, netlists and other objects 525 used by the analysis tool 511 may be stored in storage 520. A user may access the objects 525 stored in storage 520 with the client 510 via the analysis tool 511, where the analysis tool 511 is capable of accessing storage apparatus 520 and displaying the objects 525 and the data associated with the objects. The analysis tool 511 may include a user interface, for example a program, application or middleware that acts as a front end to and facilitates access to objects in storage 520. The analysis tool 511 may facilitate one-to-one correspondence definition using the tools and procedures described herein. The user may interact with the analysis tool 511 through a number of input devices, such as by inputting a selection as with a mouse or inputting a request as with a keyboard. The user may observe the analysis results on an output device or display. The analysis tool 511 may run in an application window controlled by the user. As shown in FIG. 5, a client 510 may be a stand-alone system, as may be of particular interest where the components being analyzed and tested are highly confidential. In an embodiment (not shown), more than one system, for example more than one instance of client 510, can be used to carry out the embodiments of the present disclosure. The more than one instance of client 510 may or may not communicate with each other.

Figure 6:
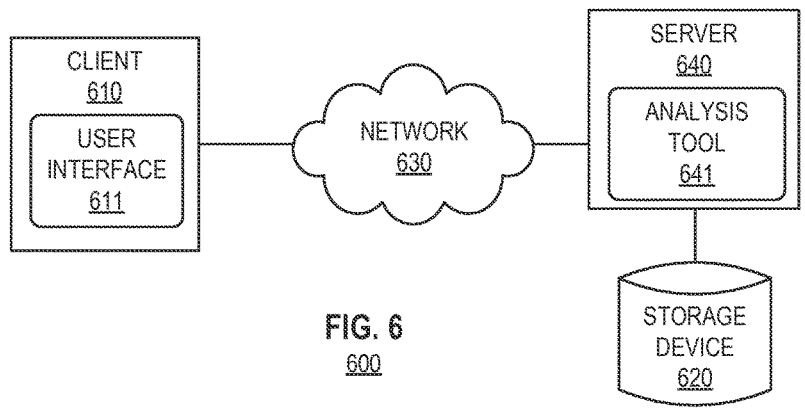
FIG. 6 is a simplified block diagram of a system according to an embodiment.

FIG. 6 is a simple block diagram illustrating components of an exemplary system 600 according to an embodiment. As shown in FIG. 6, system 600 may include a client 610 having a user interface 611. The client 610 may be connected to a server 640 via a network 630. The analysis tool 641, which in this embodiment is located at server 640, may have access to storage device 620 storing hardware models, instruction sets, software packages, timing files, netlists and other objects utilized by the analysis tool 641. The storage device 620 may be a stand-alone storage system, or may be part of server 640. The server 640 may include a processor that performs a method in accordance with the disclosed embodiments. Such a server then would be part of an overall test system in accordance with the disclosed embodiments.

A user may access an analysis tool 641 at the server 640 via the client 610 having a user interface 611 capable of accessing and displaying the design and the results of the one-to-one correspondence definition. The client 610 may be any computing system that facilitates the user accessing storage device 620, for example a personal computer. The network 630 may be a wired or wireless network that may include a local area network (LAN), a wireless network, the Internet, or any other network available for accessing the analysis tool 641 and storage device 620 from the client 610.

The server 640 may be a network server accessible to the client 610 via the network 630 that may manage access to storage device 620. The user interface 611 may receive instructions regarding testing a design from the user and utilizing the objects stored in memory storage 620, facilitate a display of the analysis or the information gathered during the analysis. Multiple different clients (not shown) may access storage device 620 via the network 630 and request access to the objects stored therein. In another networked environment, the analysis tool may be executed on a network capable client and access the models, packages and other objects stored in one or more storage devices via a network and communications server. As shown in FIG. 6, a client 610 may be a stand-alone system, as may be of particular interest where the components being simulated are highly confidential. Alternatively, client 610 may be part of a networked environment. As with the embodiment of FIG. 5, in an embodiment (not shown), more than one system, for example more than one instance of client 610 and/or server 640, can be used to carry out the embodiments of the present disclosure.

Figure 7:
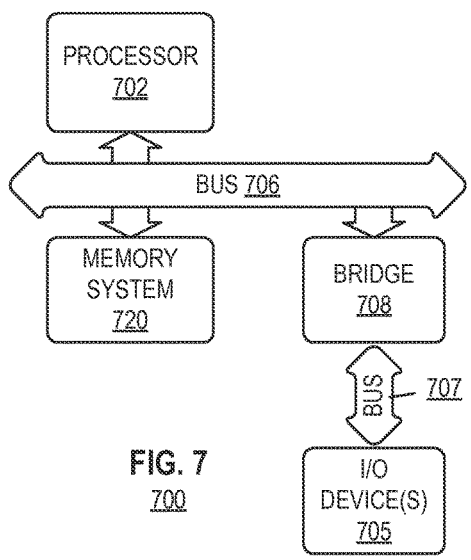
FIG. 7 is a simplified block diagram of a system according to an embodiment.

FIG. 7 is a simplified block diagram of a device 700 implementing the methods and systems described herein. As shown in FIG. 7, the device 700 may include a processor 702, a memory system 720, and at least one input/output (I/O) device 705. The processor may be implemented according to the methods and systems described herein. For example, the processor may be configured to perform the steps of methods 100 and/or 200 shown in FIGS. 1 and 2.

The processor 702, memory system 720, and I/O device (s) 705 may be communicatively coupled to each other. The communication may be implemented in a variety of ways, e.g., via at least one computer bus 706 and/or bridge device 708. The I/O device(s) 705 may include network adapters and/or mass storage devices from which the device 700 may receive commands for executing the methods described herein. The I/O device(s) 705 may be implemented according to the methods and systems described herein. For example, the I/O device(s) may receive input from a user, e.g., a matching command.

Although the foregoing description includes several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

As used in the appended claims, the term "computer-readable medium" may include a single medium or multiple media, such as a centralized or distributed database, and/or associated caches and servers that store one or more sets of instructions. The term shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

The present specification describes components and functions that may be implemented in particular embodiments which may operate in accordance with one or more particular standards and protocols. However, the disclosure is not limited to such standards and protocols. Such standards periodically may be superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

For example, operation of the disclosed embodiments has been described in the context of servers and terminals that implement analysis tools in electronic design automation (EDA) applications. These systems can be embodied in electronic devices or integrated circuits, such as application specific integrated circuits, field programmable gate arrays and/or digital signal processors. Alternatively, they can be embodied in computer programs that execute on personal computers, notebook computers, tablets, smartphones or computer servers. Such computer programs typically are stored in physical storage media such as electronic-, magnetic- and/or optically-based storage devices, where they may be read to a processor, under control of an operating system and executed. And, of course, these components may be provided as hybrid systems that distribute functionality across dedicated hardware components and programmed general-purpose processors, as desired.

In addition, in the foregoing Detailed Description, various features may be grouped or described together the purpose of streamlining the disclosure. This disclosure is not to be interpreted as reflecting an intention that all such features are required to provide an operable embodiment, nor that the claimed embodiments require more features than are expressly recited in each claim. Rather, as the following claims reflect, subject matter may be directed to less than all of the features of any of the disclosed embodiments. Thus, the following claims are incorporated into the Detailed Description, with each claim standing on its own as defining separately claimed subject matter.

Also, where certain claims recite methods, sequence of recitation of a particular method in a claim does not require that that sequence is essential to an operable claim. Rather, particular method elements or steps could be executed in different orders without departing from the scope or spirit of the invention.

What is claimed is:

1. A method implemented by an electronics layout tool to synthesize a behavioral description of a circuit into a structural description of the circuit, the method comprising:

facilitating generation of the structural description of the circuit by:
  defining, by one or more processors, operations of a function to be performed in the electronics layout tool;
  rendering, by one or more processors, a user interface based on the defined function operations, the user interface including at least one source element;
  receiving, by one or more processors, a selection of at least one of the at least one source element via the user interface;
  creating, by one or more processors, a drag set based on the selected at least one source element, the drag set being movable within the user interface and including at least one candidate on which at least one operation of the function is performed;
  responsive to a determination, by one or more processors, that at least one source element of the drag set overlaps with at least one target element in the user interface, performing a matching operation on the at least one source element and the at least one target element associated with the overlap; and
  generating, by one or more processors, a one-to-one correspondence between the at least one source element and the at least one target element associated with the overlap based on the matching operation; and
generating the structural description of the circuit based on the facilitating.

2. The method of claim 1, wherein a match between the at least one source element and the at least one target element is indicated when at least one element of the at least one source element is above a threshold; and
  wherein the at least one source element and the at least one target element include a same master.

3. The method of claim 2, wherein the matching operation includes determining connections for the at least one source element and the at least one target element.

4. The method of claim 3, wherein the facilitation further includes confirming the match, the confirming including:
  removing, by the processor, matched elements from the drag set;
  updating, by the processor, the drag set with those selected source elements that are unmatched; and
  building, by the processor, the one-to-one correspondence including forming connections between the matched source and target elements.

5. The method of claim 2, wherein the facilitating further includes:
  updating, by the processor, the user interface subsequent to the receiving a selection; and
  updating, by the processor, the user interface subsequent to the determination that the at least one element of the at least one source element is above the threshold value.

6. The method of claim 5, wherein the updating the user interface subsequent to the receiving the selection includes indicating those elements that have been selected.

7. The method of claim 5, wherein the updating the user interface subsequent to the determination that at least one element of the at least one source element exceeds the threshold value includes indicating at least one of: a selected source element, the at least one element of the at least one source element, and the target element having the same master as the at least one element of the at least one source element above the threshold value.

8. The method of claim 2, wherein the one-to-one correspondence is defined with less than three input commands.

9. The method of claim 1, wherein the facilitating further includes, subsequent to the creating of the drag set, transforming, by the processor, the drag set.

10. The method of claim 9, wherein the transforming of the drag set includes at least one of: translating, rotating, and mirroring.

11. The method of claim 1, wherein the rendering of the user interface includes at least one of displaying, by a display device, a schematic including a graphical representation of the at least one source element and a form including a textual representation of the at least one source element.

12. The method of claim 11, wherein the schematic and the form are interchangeable, and wherein input to one of the schematic and the form is reflected in the displaying of the other of the schematic and the form.

13. The method of claim 1, wherein the drag set includes at least one reference element, the reference element indicating an original configuration of the drag set.

14. An electronics layout system for synthesizing a behavioral description of a circuit to generate a structural description of the circuit, the system comprising:
  a storage apparatus to store the behavioral description of the circuit and a drag set; and
  a processor including:
    a function definition component configured to:
      define operations of the function to be performed in the electronics layout system;
      render a user interface based on the defined function, the user interface including at least one source element;
      receive a selection of at least one of the at least one source element via the user interface;
      create the drag set based on the selected at least one source element, the drag set being movable within the user interface and including at least one candidate on which at least one step of the function is performed;
      responsive to a determination that at least source one element of the drag set overlaps with at least one target element in the user interface, perform a matching operation on the at least one source element and the at least one target element associated with the overlap; and
      generate a one-to-one correspondence between the at least one source element and the at least one target element associated with the overlap based on the matching operation; and
    an output generator component configured to generate the structural description of the circuit responsive to an output of the function definition component.

15. The system of claim 14, wherein a match between the at least one source element and the at least one target element is indicated when at least one element of the at least one source element is above a threshold; and
  wherein the at least one source element and the at least one target element include a same master.

16. The system of claim 15, wherein the matching operation including determining, by the function definition component, a correspondence between a schematic version of at least one of the elements and a layout version of at least one of the elements.

17. The system of claim 16, wherein the function definition component is further configured to confirm the match, including being configured to:
  remove matched elements from the drag set;
  update the drag set with those selected source elements that are unmatched; and build the one-to-one correspondence including forming bonds between the matched elements.

18. The system of claim 14, wherein the function definition component is configured to, subsequent to the creating of the drag set, transform the drag set.

19. A non-transitory computer-readable medium storing program instructions that, when executed, cause a processor to synthesize a behavioral description of a circuit into a structural description of the circuit, the method comprising:
   facilitating generation of the structural description of the circuit by:
      defining operations of a one-to-one correspondence between a source element in a schematic circuit layout and a target element in a physical circuit layout;
      rendering a user interface based on the defined operations of the one-to-one correspondence, the user interface including at least one source element;
      receiving a selection of at least one of the at least one source element via the user interface;
      creating a drag set based on the selected at least one source element, the drag set being movable within the user interface and including at least one candidate on which at least one operation of the one-to-one correspondence is performed;
      transforming the drag set;
      responsive to a determination that at least one source element of the drag set overlaps with at least one target element in the user interface, performing a matching operation on the at least one source element and the at least one target element associated with the overlap; and
      generating a one-to-one correspondence between the at least one source element and the at least one target element associated with the overlap based on the matching operation; and
   generating the structural description of the circuit based on the facilitating.

20. The non-transitory computer-readable medium of claim 19,
   wherein a match between the at least one source element and the at least one target element is indicated when at least one element of the at least one source element is above a threshold; and
   wherein at least one source element and the at least one target element include a same master.

* * * * *